July 28, 1936.  R. J. RIDGE  2,048,711
CONTROL SYSTEM FOR AIR CONDITIONING APPARATUS
Filed Nov. 22, 1933
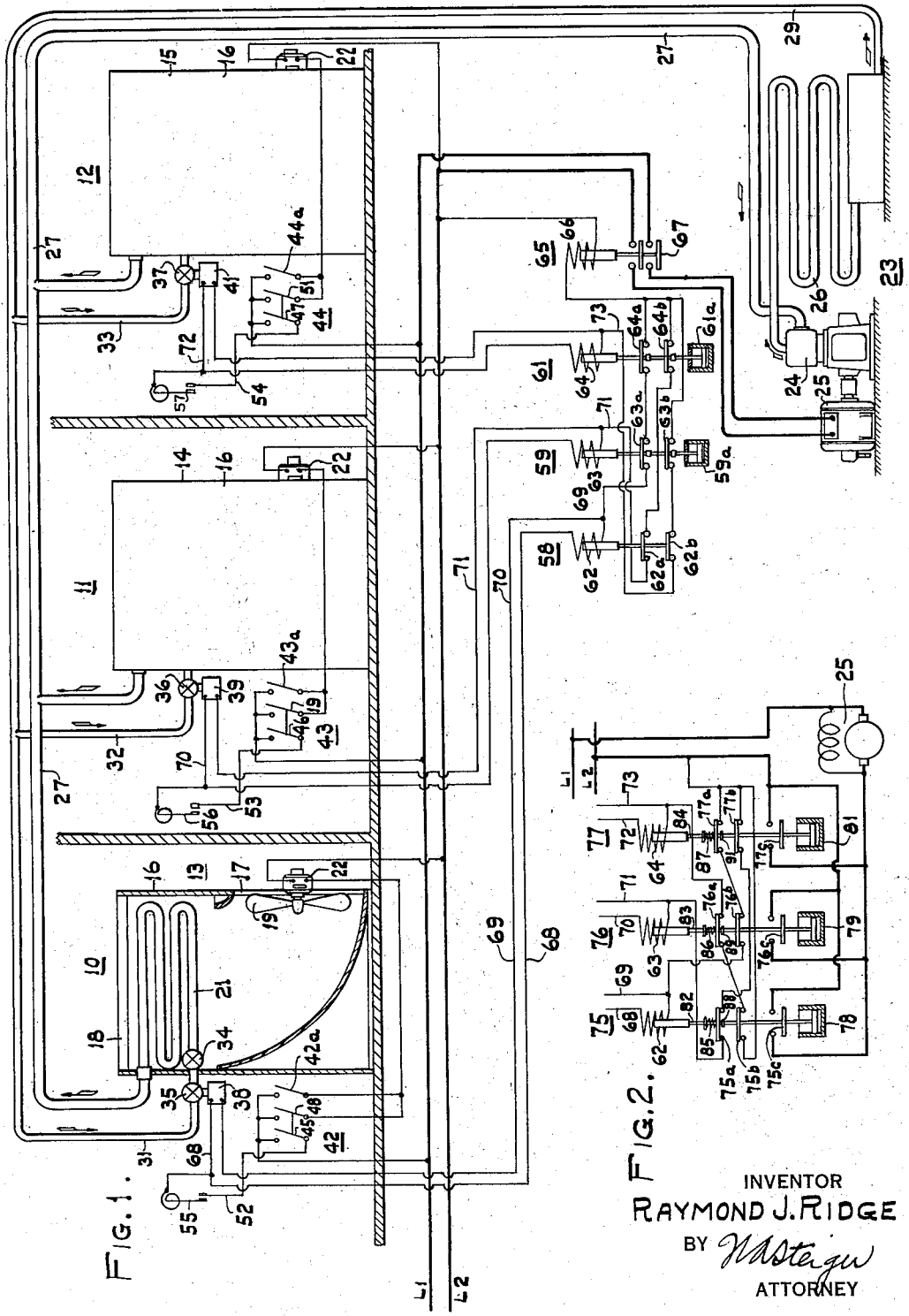
INVENTOR
RAYMOND J. RIDGE
BY
ATTORNEY Patented July 28, 1936

2,048,711

UNITED STATES PATENT OFFICE 2,048,711

CONTROL SYSTEM FOR AIR CONDITIONING APPARATUS

Raymond J. Ridge, Lansdowne, Pa., assignor to Westinghouse Electric & Manufacturing Company, East Pittsburgh, Pa., a corporation of Pennsylvania Application November 22, 1933, Serial No. 699,286

26 Claims. (Cl. 62—4)

My invention relates to a control system for air conditioning apparatus and it has for an object to provide an improved system therefor.

A further object of my invention is to provide a system of control for a plurality of air treating devices which receive medium for treating the air from a common source.

A still further object of my invention is to provide such a system in which the number of air treating devices which may be operated at one time is limited.

A further object of my invention is to provide a control system for a plurality of air cooling devices which automatically shifts the flow of refrigerant from one device to another device under certain conditions.

While not so limited, my invention is particularly applicable to small air treating units, commonly referred to as room conditioners. When functioning to cool air, they usually include an evaporator, or cooling coil, which is disposed within a cabinet and a fan for translating air through the cabinet to the room or space being cooled. When air coolers are operated in multiple from a common source of refrigerant having a capacity equivalent to a fraction of the total refrigerating requirements of all of the air coolers, it is necessary to control the apparatus so that the load which may be connected to the refrigerating machine at one time is limited to the capacity thereof. Installations of this kind are frequently made and it is to such installations that my invention applies.

In practicing my invention, I provide an electrical circuit for each cooling unit or, if the units are operated in groups, for each group of units. A switch in each circuit controls the flow of refrigerant to its respective unit or units through the medium of an electrically-operated valve. A relay is provided for each circuit and includes a solenoid, which is connected in the circuit, and contacts which are operated by the solenoid for controlling the electrical circuits of the other cooling units. The various circuits are thereby interlocked so that, when a predetermined maximum number of circuits, less than the total number are energized to permit flow of refrigerant to the respective cooling unit or units, the remaining circuits are rendered inoperable by the relay or relays of the energized circuit or circuits. In the embodiment described hereinafter, which is to be taken as illustrative of my invention rather than limiting, the circuits are interlocked so that the remaining circuits are rendered inoperative when any one circuit is energized. Means are provided for initiating operation of the refrigerating machine when any circuit is energized to permit flow of refrigerant to its associated cooling unit or group of units.

Automatic control of the various cooling units in accordance with the temperature of the air in the spaces served thereby may be provided by connecting a thermostat in the electrical circuit of the cooling unit to be controlled and subjecting the thermostat to the air in the space being cooled.

When a control system arranged in accordance with my invention is used with a plurality of thermostatically controlled air coolers, the supply of refrigerant may be shifted from one cooler, when its thermostat operates to stop the flow of refrigerant thereto, to a second cooler whose thermostat is calling for cooling. If no thermostat of another cooler calls for cooling, the refrigerating machine is automatically shut down when the first thermostat operates to terminate flow of refrigerant to its cooler. This operation is not limited to two air coolers as a greater number may be thermostatically operated in this manner.

These and other objects are effected by my invention, as will be apparent from the following description and claims taken in connection with the accompanying drawing, forming a part of this application, in which:

Fig. 1 is a diagrammatic view showing a plurality of air cooling devices controlled by my novel control system; and, Fig. 2 is a diagrammatic view showing a modified arrangement of some of the elements used in the control system shown in Fig. 1.

I have shown in Fig. 1 a plurality of rooms or spaces 10, 11, and 12 in which a plurality of air cooling devices 13, 14, and 15 are respectively disposed for cooling the air therein. All of the devices 13, 14, and 15 are of similar construction so I have shown but one of them in section; it being understood that all include similar elements. Each of the devices includes a cabinet 16 having an inlet opening 17 through which air to be treated enters the cabinet 16 and an outlet opening 18 through which air is discharged from the cabinet 16 into the room being served. A fan 19 is disposed adjacent the inlet opening 17 for drawing air therethrough and for translating it through the outlet opening 18. An evaporator or cooling coil 21 is disposed within the cabinet 16 intermediate of the openings 17 and 18, so that it is contacted by air passing through the cabinet. The fan 19 is preferably driven by an electric motor 22.

The evaporators 21 of the devices 13, 14, and 15 are supplied with refrigerant from a refrigerating machine 23 which preferably includes a compressor 24, driven by a motor 25, and a condenser 26. The refrigerating system disclosed is of the well known compressor-expander type in which spent refrigerant vapor is withdrawn by the compressor 24 from the evaporators 21 through a branched conduit 27 and is compressed by the compressor 24 to a relatively high pressure before being discharged into the condenser 26 where it is cooled and liquefied. Liquid refrigerant is then conveyed by a conduit 29 to branch conduits 31, 32, and 33 which lead to the evaporators 21 of the cooling devices 13, 14, and 15 respectively. An expansion device 34 is connected in each of the branch conduits 31, 32, and 33 for reducing the pressure of the refrigerant therein to the relatively low pressure within the evaporators 21. The refrigerant when subjected to the low pressure in the evaporator 21, vaporizes and abstracts heat therefrom in a well known manner. The cycle is then repeated.

It is frequently desirable to install a number of air cooling devices which receive refrigerant from a common source, as disclosed in Fig. 1, in which the total refrigerating requirements of the devices exceed the capacity of the refrigerant source. When operating a plurality of devices in this manner, the load that is applied to the refrigerating machine should be limited to the capacity thereof. My improved control system applies to air conditioning apparatus operated in this manner and a description of it will now be given.

It is assumed in the present case, as an example, that the refrigeration required by each of the devices 13, 14, and 15 is substantially equal to the capacity of the refrigerating machine 23 so that only one of the devices will be connected to the refrigerating machine 23 at one time. This may be accomplished by a plurality of electrically-operated valves 35, 36, and 37 which are respectively connected in the refrigerant supply conduits 31, 32, and 33 serving the various air cooling devices. The valves 35, 36, and 37 are preferably operated by solenoids 38, 39 and 41, respectively, and in such a manner that, when a solenoid is energized, its respective valve is opened and conversely when the solenoid is deenergized the valve is closed. As solenoid-operated valves are well known in the art, a detailed description of them is deemed unnecessary.

The air cooling devices 13, 14, and 15 preferably have double pole switches 42, 43, and 44 associated therewith which may be operated to render the devices operable and inoperable. The switches 42, 43, and 44 include poles 45, 46, and 47 which respectively control the solenoids 38, 39, and 41 and poles 48, 49, and 51 which control the operation of the fan motors 22 associated with their respective air cooling devices. The switches 42, 43, and 44 are disposed adjacent their respective air cooling devices for convenience, and are preferably carried thereby. Additional switches 42a, 43a, and 44a are provided for control of the fans 22 so that the latter may be operated for ventilation without air cooling.

The poles 45, 46, and 47 are connected to their respective solenoids 38, 39, and 41 by conductors 52, 53, and 54 and, if automatic control of the air cooling devices is desired, thermostats 55, 56, and 57 are connected in these conductors. The thermostats are of conventional construction and operated to close their contacts at a predetermined high temperature and to open the same at a predetermined low temperature. The thermostats 55, 56, and 57 are so disposed that changes in temperature of the air in the spaces 10, 11, and 12 are readily reflected therein.

In order that the load imposed upon the refrigerating machine 23 at one time may be limited to its capacity, which load in the present embodiment equals the refrigeration required by one air cooling device, I have provided a plurality of relays 58, 59 and 61 for limiting the number of valves 35, 36, and 37 which may be opened at one time. The relays include solenoids 62, 63, and 64 preferably connected in parallel with the solenoids 38, 39, and 41, respectively, whereby energization of a valve solenoid is accompanied by energization of its associated relay solenoid.

The solenoid 62 operates a pair of switches 62a and 62b, the solenoid 63 operates switches 63a and 63b, and the solenoid 64 operates switches 64a and 64b. The various switches are normally closed and are opened when their respective solenoids are energized. The connections between the relay solenoids and the switches operated thereby are such that the switches of one relay control the circuits leading through the solenoids of the other relays; for example, the switches 62a and 62b of the relay 58 control the circuits including solenoids 63 and 64 of relays 59 and 61 respectively. The relays are, therefore, electrically interlocked so that only one of the relay solenoids 62, 63, or 64 may be energized at a time. As the valve solenoids 38, 39, and 44 are respectively connected in parallel with the solenoids 62, 63, and 64, it follows that only one valve solenoid may be energized at one time. The load on the refrigerating machine is therefore limited to that imposed by the one air cooling device whose solenoid valve is open.

The relays 59 and 61 are preferably provided with time delay devices, preferably dash pots, as shown at 59a and 61a. These dash pots retard the upward, or switch opening movement of the relay solenoid but offer no delay to the downward or switch closing movement. They are calibrated so that the time intervals between energization of the solenoids and operation of their switches are different for the two relays. For instance, the dash pot 59a may be calibrated so that the contacts 63a and 63b are opened ⅕ of a second after energization of the solenoid 63, while the dash pot 61a may be calibrated for a delay of ⅖ of a second between energization of the solenoid 64 and the opening of switches 64a and 64b. As the relay 58 opens substantially instantaneously when energized, it will be seen that all relays would operate at different times if simultaneously energized. The purpose of this operation will be referred to later.

It is desirable that operation of the refrigerating machine 23 be initiated when any of the solenoid valves 38, 39, or 41 are opened to pass refrigerant to their respective evaporators 22. Accordingly, a relay 65 having a solenoid 66 and switches 67 is provided. The solenoid 66 is electrically-connected in circuit with all of the solenoids 62, 63, and 64 and is simultaneously energized with energization of any of the latter solenoids. When energized, the solenoid 66 closes its contacts 67 so that a circuit is completed from line conductors L1 and L2 to the motor 25 for starting the latter.

The operation of my improved control system will now be described. When inoperative, the various elements are in the positions shown in the drawing. Assuming the temperature of the air in the space 10 is above that to be maintained and it is desired to start the air cooling device 13 which serves the space 10, the double pole switch 42 is closed completing a first circuit from the line conductor L1, pole 48, motor 22 to the other line conductor L2. Operation of the fan 19 is therefore initiated. A second circuit is completed from the line conductor L1, pole 45 of the switch 42, conductor 52, thermostat 55 which is in closed circuit position due to the high temperature in the space 10, conductor 68, solenoids 38 and 62, conductor 69, switch 63a, switch 64a, solenoid 66 to the other line conductor L2. Energization of the solenoid 38 opens its valve 35 so that liquid refrigerant from the conduit 31 is permitted to flow to expansion device 34 and evaporator 21 for abstracting heat from the latter. Energization of the solenoid 62 opens the switches 62a and 62b which for the moment is of no consequence. Energization of the solenoid 66 closes the main switch 67 to complete a circuit from line conductors L1 to L2, through the motor 25. Operation of the latter is initiated and the compressor 24 is driven to circulate refrigerant as previously described.

Air translated by the fan 19 is passed in heat exchanging relation with the evaporator 21 and is cooled before passing through the outlet opening 18 to the space 10. When the temperature of the air in the space 10 has been reduced to the desired degree, the thermostat 55 moves to open its contacts thereby deenergizing the solenoids 38 and 66. The valve 35 is closed by deenergization of the former and operation of the refrigerating machine 23 terminated by the opening of switch 67 which is effected by the deenergization of the latter. It will be seen that the fan 19 continues to operate to translate air to the space 10 for ventilation as the circuit through the fan motor 22 is independent of the thermostat 55.

During the period that the refrigerating machine 23 is operating to circulate refrigerant through the valve 35 to the air cooling device 13, the control functions to prevent the opening of additional valves. If the switches 43 and 44 are closed in an attempt to initiate operation of the air cooling devices 14 and 15, the circuits through the solenoids 39 and 41 cannot be energized as these circuits are open at switches 62a and 62b respectively. Therefore, the valves 36 and 37 cannot be opened as long as valve 35 is open.

When operated under automatic temperature control, the supply of refrigerant may be transferred from one air cooling device to another when the thermostat of the one device moves to its open circuit position and the thermostat of the second device is calling for cooling. For example, assuming the switches 42 and 43 are closed and that the device 13 is operating. The solenoids 38, 62, and 66 are energized as previously described. The solenoids 39 and 63 are deenergized as their circuit while closed at switch 43 is open at switch 62a. When the temperature in its associated space 10 has been depressed to the predetermined degree, the thermostat 55 moves to its open circuit position and the solenoids 38, 62, and 66 are deenergized and move to the position shown in the drawing. The switch 62a closes to complete the circuit from line conductor L1, pole 46 of switch 43, conductor 53, thermostat 56, conductor 70, solenoids 39 and 63, conductor 71, closed switch 62a, switch 64b, solenoid 66 to the other line conductor L2. Energization of the solenoid 39 opens the valve 36 to admit refrigerant to the evaporator of the air cooling device 14, and energization of the solenoid 66 maintains operation of the motor 25 by closing the contacts 67. Energization of the solenoid 63 opens the switches 63a and 63b so that the circuit through the valve solenoid 38 cannot be completed until the solenoid 63 is deenergized and the switch 63a closed.

This method of operation is not limited to two devices as three or more may be operated in this manner. For instance, assuming again that the device 13 is operating and that switches 43 and 44 are closed. The circuits controlled by the latter are both open at switches 62a and 62b respectively, bearing in mind that solenoid 62 is now energized. When the thermostat 55 becomes satisfied and moves to its open circuit position, the solenoids 38, 62, and 66 are deenergized. The switches 62a and 62b close to complete circuits through both solenoids 63 and 64. As previously described, the relay 59 operates somewhat in advance of relay 61 due to the calibration of the dash pots 59a and 61a. Therefore, the switch 63b opens the circuit extending through solenoid 64 before the switch 64b can open to break the circuit through solenoid 63. As a result, the solenoids 39, 63, and 66 are energized, the energizing circuit being previously described.

It will be seen that the time delay devices 59a and 61a are necessary to provide relays which operate at different speeds. Otherwise, when two solenoids are simultaneously energized, the switches of each may deenergize the solenoid of the other when opened. The deenergized solenoids would permit the switches to close again and the solenoids would again be energized. This operation may continue, causing "chattering" of their contacts.

When the temperature of the air in the space 11 has been depressed to the desired degree, the thermostat 56 moves to its open circuit position to discontinue cooling action of the device 14 and to deenergize the solenoid 63, closing the switches 63a and 63b. If the thermostat 57 is still closed, a circuit will be completed from the line conductor L1, pole 47 of switch 51, conductor 54, thermostat 57, conductor 72, solenoids 41 and 64, conductor 73, switch 62b, switch 63b, solenoid 66 to the other line conductor L2. The air cooling device 15 operates to cool the air in space 12 in the same manner as described in connection with the operation of the devices 13 and 14. It will be apparent that the circuits leading through valves 38 and 39 cannot be energized during this operation of the device 15 as the switches 64a and 64b which are included in these circuits are open.

In connection with the starting of the air cooling device 15 just described, it will be apparent that, if the thermostats 55 and 57 were both in their closed circuit positions when the thermostat 56 opened, the air cooling device 13 would have started instead of the device 15. The reason for this is that relay 58 having no time delay would open its switch 62b to deenergize the solenoid 64 of relay 61, before the latter relay would have time to open the contacts 64a, due to the retarding action of the dash pot 61a.

From the foregoing, it will be seen that the operation of the three devices automatically is one of preference, that is, when any device operates to terminate the flow of refrigerant thereto and the other devices are calling for cooling, the device 13 has preference over devices 14 and 15 to receive refrigerant, and the device 14 has preference over device 15.

If it is desired to operate the air cooling devices so that the supply of refrigerant is taken by the devices in turn, the relays 58, 59 and 61 may be modified as shown in Fig. 2. In this embodiment, the operation is such that, when the supply of refrigerant to an air cooling device is no longer required, it is surrendered to the next succeeding device that does require it. In other words, the supply passes from device 13 to device 14 if needed or, if not, to device 15; from device 14 to device 15 if needed or, if not, to device 13; and from device 15 to device 13 if needed, or, if not, to device 14.

Reference will now be had to Fig. 2 which discloses a plurality of relays 75, 76, and 77 which are also electrically interlocked so that only one may be energized at a time. In this respect, they function the same as the relays 58, 59, and 61 of Fig. 1. The relays 75, 76, and 77 are connected to the circuits of the air cooling devices 13, 14, and 15 through the conductors 68 to 73, inclusive, in the same manner as disclosed in the preceding figure.

The relays 75, 76, and 77 include solenoids 62, 63, and 64 respectively. The relay 75 has normally closed switches 75a and 75b, the relay 76 has corresponding switches 76a and 76b and relay 77 includes switches 77a and 77b. The relays 75, 76, and 77 also include normally open switches 75c, 76c and 77c, respectively, which switches are connected in parallel and control the main circuit of the compressor motor 25. Time delay devices, preferably dash pots 78, 79, and 81 are provided for the relays. These dash pots offer no resistance to the upward movement of the switches but provide a delay to the downward movement thereof. These time delay devices need not be adjusted so that the relays operate at different speeds as is the case in Fig. 1, but may operate at the same speed.

The various switches of the relays 75, 76, and 77 are connected to stems 82, 83, and 84, which stems transmit motion of the solenoids to their respective switches. The switches 75a, 76a and 77a are connected to their respective stems in sliding relation through springs 85, 86, and 87. Stops 88, 89, and 91 carried by the stems limit the relative movement of the switches with respect to the stems. The purpose of this construction is to provide switches which close in sequence when their respective solenoids are de-energized. The operation of the system is as follows.

Assuming the air cooling device 13 is operating, the solenoid 62 of relay 75 is energized and its switches 75a and 75b are open and its switch 75c is closed. The latter completes a circuit from the line conductors L1 and L2 through the motor 25, so it is operating to circulate refrigerant. The switches 75a and 75b being open prevent energization of the solenoids 63 and 64 and the solenoid valves 36 and 37 as described in the previous embodiment. Assume that the air cooling devices 14 and 15 are rendered operable by closing their switches 43 and 44, that their thermostats 56 and 57 are calling for cooling, being in closed circuit position, and that the thermostat 35 opens to discontinue operation of the air cooling device 13. The solenoids 38 and 62 are deenergized on the latter operation and switches 75a and 75b move toward their closed position. As the moving element of the former engages the stop 88, its travel to its closed position is less than the travel necessary to close switch 75b. Therefore, when switch 75a closes, a circuit is established through solenoid 63 which opens its switches 76a and 76b and closes switch 76c to maintain operation of the motor 25. Switch 75b closes after the lost motion provided by the spring 85 is taken up, but a circuit through the solenoid 64 is not established due to the opening of switch 76a when the solenoid 63 was energized. It will be apparent that the supply of refrigerant has passed from the air cooling device 13 to the next succeeding device 14.

When the device 14 surrenders the supply of refrigerant, it will pass to device 15 as switch 76a will close before switch 76b to energize solenoid 64. When switch 76b closes, solenoid 62 cannot be energized as switch 77a has been opened by its solenoid 64. When the air cooling device 15 surrenders the refrigerant supply, it passes on to the air cooling device 13 as switch 77a closes to complete a circuit through solenoid 62 before switch 77b closes, and when the latter occurs, solenoid 63 cannot be energized as switch 75a has been opened by the energization of solenoid 62. It has been assumed in all of the operations just described that the thermostats of the two inactive air coolers are both calling for cooling when the active cooler surrenders the supply of refrigerant. Of course, if only one thermostat were calling for cooling, its cooling device would receive the refrigerant supply regardless of whether it were the next succeeding or not. If all thermostats were satisfied when operation of an air cooling device is terminated, it will be apparent that the refrigerating machine will stop operating as all switches 75c, 76c, and 77c are open.

It will be understood that the air cooling devices may be manually controlled entirely, and in this case the thermostats would be omitted. In this event, the conductors 52, 53, and 54 would be respectively connected to conductors 68, 70, and 72.

From the foregoing, it will be seen that I have provided, primarily, a control system for a plurality of air cooling devices operating from a common refrigerating source in which a limited number of the devices may be connected to said source at one time, and that, when automatically controlled by instruments, the supply of refrigerant may be transferred from one to another, preferentially, or in a predetermined sequence.

I have shown my novel control applied to air cooling apparatus but it will be understood that apparatus utilizing air treating media other than a cooling medium may be controlled thereby.

While I have described my invention in an embodiment in which only one cooling device may be operated at one time, it is to be understood that the invention is not so limited, it being necessary only that the number of cooling devices in operation at one time be limited to a predetermined number less than the total number of cooling devices.

While I have shown my invention in but two forms, it will be obvious to those skilled in the art that they are not so limited, but are susceptible of various changes and modifications without departing from the spirit thereof, and I desire, therefore, that only such limitations shall be placed thereupon as are imposed by the prior art or as are specifically set forth in the appended claims.

What I claim is:

1. The combination of a plurality of evaporators, means for selectively supplying refrigerant to said evaporators, and means responsive to the operation of each evaporator, and operative in response to the operation of a predetermined number of evaporators less than the total number thereof, for rendering the remaining evaporator or evaporators inoperative.

2. The combination of a plurality of evaporators, means for providing a supply of refrigerant for the evaporators, a plurality of valves for controlling the flow of refrigerant from the supply means to said evaporators, a mechanism associated with each valve for opening and closing the same, and means responsive to the opening of a predetermined number of valves, less than the total number thereof, for rendering the mechanisms of the remaining valves incapable of opening the same.

3. The combination of a plurality of evaporators, means for providing a supply of refrigerant for the evaporators, a plurality of valves for controlling the flow of refrigerant from the supply means to said evaporators, an electrically-operated mechanism associated with each valve for opening and closing the same, an electrical circuit for each mechanism which, when energized, effects opening operation thereof, and means responsive to the energization of one circuit for rendering the remaining circuits incapable of energization.

4. The combination of a plurality of evaporators, means for providing a supply of refrigerant for the evaporators, a plurality of valves for controlling the flow of refrigerant from the supply means to said evaporators, an electrically-operated mechanism associated with each valve for opening and closing the same, an electrical circuit for each mechanism which, when energized, effects opening operation thereof, and means responsive to the energization of a predetermined number of circuits, less than the total number thereof, for rendering the remaining circuits incapable of energization.

5. The combination of a plurality of evaporators, common means for supplying refrigerant to said evaporators, means associated with each evaporator for controlling the supply of refrigerant thereto and including an electrical circuit which must be closed to supply refrigerant, and a relay including a solenoid whose energization is controlled by one of said circuits and contacts in the remaining circuits which are opened and prevent closing of said remaining circuits while said one circuit is closed.

6. The combination of at least three evaporators, means for providing a supply of refrigerant for said evaporators, a plurality of devices for respectively controlling the flow of refrigerant to the evaporators, and means interconnecting said devices for rendering all remaining devices inoperable when a predetermined number of the devices are adjusted to permit flow of refrigerant to their respective evaporators, said last-mentioned means being adapted to render the remaining devices operable in a predetermined sequence, when said predetermined number of devices operate to discontinue flow of refrigerant to their respective evaporators, said predetermined number of devices being at least two less than the total number thereof.

7. The combination of at least three evaporators, means for providing a supply of refrigerant for said evaporators, a plurality of devices for respectively controlling the flow of refrigerant to the evaporators, and means interconnecting said devices for rendering all remaining devices inoperable when a predetermined number of devices less than the total number thereof are adjusted to permit flow of refrigerant to their respective evaporators, said last-mentioned means being adapted to render the remaining devices operable when one of said predetermined number of devices operates to discontinue flow of refrigerant to its respective evaporator.

8. The combination of a plurality of air cooling elements for respectively cooling the air in a plurality of spaces, means associated with each element for translating air in heat exchanging relation therewith, means for providing a supply of cooling medium for said elements, a plurality of devices responsive to a condition of the air in their respective spaces for controlling the supply of medium to their associated elements, and means interconnecting said devices for rendering all remaining devices inoperable when any one of said devices operates to permit flow of medium to its respective element, said last-mentioned means being adapted to render said remaining devices operable when said one device operates to discontinue the flow of medium to its respective element.

9. The combination of a plurality of air cooling elements for respectively cooling the air in a plurality of spaces, means for providing a supply of cooling medium for said elements, a plurality of devices responsive to a condition of the air in their respective spaces for controlling the supply of medium to their associated elements, and means interconnecting said devices for rendering all remaining devices inoperable when one of said devices operates to permit flow of medium to its respective element, said last-mentioned means being adapted to render said remaining devices operable in a predetermined sequence, when said one device operates to discontinue the flow of medium to its respective element.

10. The combination of a plurality of air cooling elements, means for circulating air in heat-exchanging relation with said elements, means for providing a supply of air cooling medium for said elements, a plurality of devices for controlling the flow of medium to their respective elements, and means for rendering all remaining devices inoperable when any one device is adjusted to permit flow of medium to its respective air cooling element, said last-mentioned means being adapted to render the remaining devices operable when the one device is adjusted to discontinue flow of medium to its respective element.

11. The combination of a plurality of air treating elements, means providing a supply of air treating medium for the air treating elements, a plurality of devices for controlling the supply of medium to the air treating elements, respectively, electrical circuits for said devices, means responsive to a condition of a predetermined number of circuits less than the total number of said circuits for rendering all remaining circuits inoperative to permit flow of medium to their respective air treating elements when said predetermined number of circuits are conditioned to permit flow of medium to their respective air treating elements, and means for automatically initiating operation of the first-mentioned means when a circuit is conditioned to permit the flow of medium to its respective air treating element.

12. The combination of a plurality of air treating elements, a motor driven mechanism for providing a supply of air treating medium for the air treating elements, a plurality of electrically-operated valves for respectively controlling the flow of medium from said motor driven mechanism to the air treating elements, means responsive to the opening of any one of said valves for rendering the remaining valves incapable of being opened, and means responsive to the opening of one of the valves for initiating operation of the motor driven mechanism.

13. The combination of a plurality of air cooling elements, a refrigerating machine for providing a supply of refrigerant for said elements, a plurality of electrically operated valves for respectively controlling the flow of refrigerant from said machine to said air cooling elements, means responsive to the opening of any one valve for maintaining the remaining valves closed, and means responsive to the opening of any of the valves for initiating operation of the refrigerating machine.

14. The combination of a plurality of air cooling elements, a refrigerating machine for providing a supply of refrigerant for said elements, a plurality of electrically-operated valves for respectively controlling the flow of refrigerant from said machine to said air cooling elements, means responsive to the opening of any valve or valves of a predetermined number, less than the total number thereof, for maintaining the remaining valves closed, and means responsive to the opening of any of the valves for initiating operation of the refrigerating machine.

15. The combination of a plurality of air cooling elements, a refrigerating machine for providing a supply of refrigerant for said elements, a plurality of electrically operated valves for respectively controlling the flow of refrigerant from said machine to said air cooling elements, each valve being opened upon energization and closed upon deenergization, a switch associated with each valve for controlling the energization of the same, means responsive to the energization of one valve for deenergizing the remaining valves, and means responsive to the energization of any of the valves for initiating operation of the refrigerating machine.

16. The combination of a plurality of air cooling elements for respectively cooling the air in a plurality of spaces, a refrigerating machine, common to said elements, for providing a supply of refrigerant therefor, an electrically operated valve associated with each element for controlling the flow of refrigerant from said machine to its associated element, a switch for each valve for controlling the operation thereof, means responsive to a condition of the air in the space cooled by each element for controlling the operation of its associated valve, means responsive to the opening of each valve for rendering the remaining valves incapable of opening regardless of the position of their associated switches, and means responsive to the opening of any of the valves for initiating operation of the refrigerating machine.

17. The combination of a plurality of air cooling elements for respectively cooling the air in a plurality of spaces, a fan for each element for conveying air to be cooled in heat exchanging relation therewith, a refrigerating machine, common to said elements, for providing a supply of refrigerant therefor, an electrically operated valve associated with each element for controlling the flow of refrigerant from said machine to its associated element, a switch for each element and having a first pole for controlling the operation of the valve and a second pole for controlling the energization of the fan associated with the element, means responsive to the opening of each valve for rendering the remaining valves incapable of opening regardless of the position of said associated switches, and means responsive to the opening of any of the valves for initiating operation of the refrigerating machine.

18. The combination of a plurality of air cooling elements for respectively cooling the air in a plurality of spaces, a fan associated with each element, a refrigerating machine common to said elements for providing a supply of refrigerant therefor, a plurality of electrically operated valves for respectively controlling the flow of refrigerant from said refrigerating machine to the cooling elements, an electrical circuit for each valve, manually operated switches associated with each circuit and having one pole connected in the circuit and a second pole for controlling the operation of the fan, a solenoid connected in each of the circuits and having interlock switches respectively connected in the remaining circuits and a relay having a coil connected in said electrical circuits and common thereto, and contacts operated by the coil for controlling the energization of the refrigerating machine.

19. The combination of a plurality of air cooling elements for respectively cooling the air in a plurality of spaces, a fan associated with each element, a refrigerating machine common to said elements for providing a supply of refrigerant therefor, a plurality of electrically operated valves for respectively controlling the flow of refrigerant from said refrigerating machine to the cooling elements, an electrical circuit for each valve, manually operated switches associated with each circuit and having one pole connected in the circuit and a second pole for controlling the operation of the fan, a thermostatically operated switch in at least one of the circuits, a solenoid connected in each of the circuits and having interlock switches respectively connected in the remaining circuits and a relay having a coil connected in said electrical circuits and common thereto and contacts operated by the coil for controlling the energization of the refrigerating machine.

20. The combination, as claimed in claim 19, having a second manually-operated switch for controlling the operation of the fan and connected in parallel with the second pole of the first-mentioned manually-operated switch.

21. In comfort cooling apparatus, the combination of a plurality of air cooling elements, means for selectively supplying a cooling medium to said elements, and means responsive to the operation of any element or elements of a predetermined number less than the total number thereof for rendering the remaining element or elements inactive.

22. In comfort cooling apparatus, the combination of a plurality of evaporators for cooling the air under treatment, a plurality of fans for translating said air in heat exchanging relation with said evaporator, means for selectively supplying refrigerant to said evaporators and means responsive to the operation of any evaporator or evaporators of a predetermined number less than the total number thereof for rendering the remaining evaporator or evaporators inactive.

23. In apparatus for air cooling a plurality of spaces, the combination of air cooling means for each space, means for selectively supplying refrigerant to said cooling means, and means responsive to supply of refrigerant to the cooling means of any one space for shutting off supply of refrigerant to the cooling means of the remaining spaces.

24. The combination of first, second, and third cooling means, means for selectively supplying cooling fluid to any one of said cooling means, and means responsive to supply of cooling fluid to any one of said cooling means for shutting off the supply of cooling fluid to the remaining cooling means.

25. In comfort cooling apparatus, the combination of a plurality of air cooling elements, means for selectively supplying a cooling medium to said elements, a first means responsive to the operation of one element for rending another element incapable of being started, and a second means responsive to the operation of a second element for rendering an element other than the second element incapable of being started.

26. In comfort cooling apparatus, the combination of a plurality of air cooling elements, means for selectively supplying a cooling medium to said elements, a first means responsive to the operation of an element or elements of a predetermined number less than the total number thereof for rendering another element incapable of being started, and a second means responsive to the operation of an element or elements of a predetermined number less than the total number thereof for rendering another element incapable of being started, each of the two last-mentioned means being resopnsive to the operation of at least one element to which the other does not respond.

RAYMOND J. RIDGE.